(No Model.)
A. W. HEANY.
HAY RAKE, LOADER, AND TEDDER.
No. 439,948. Patented Nov. 4, 1890.
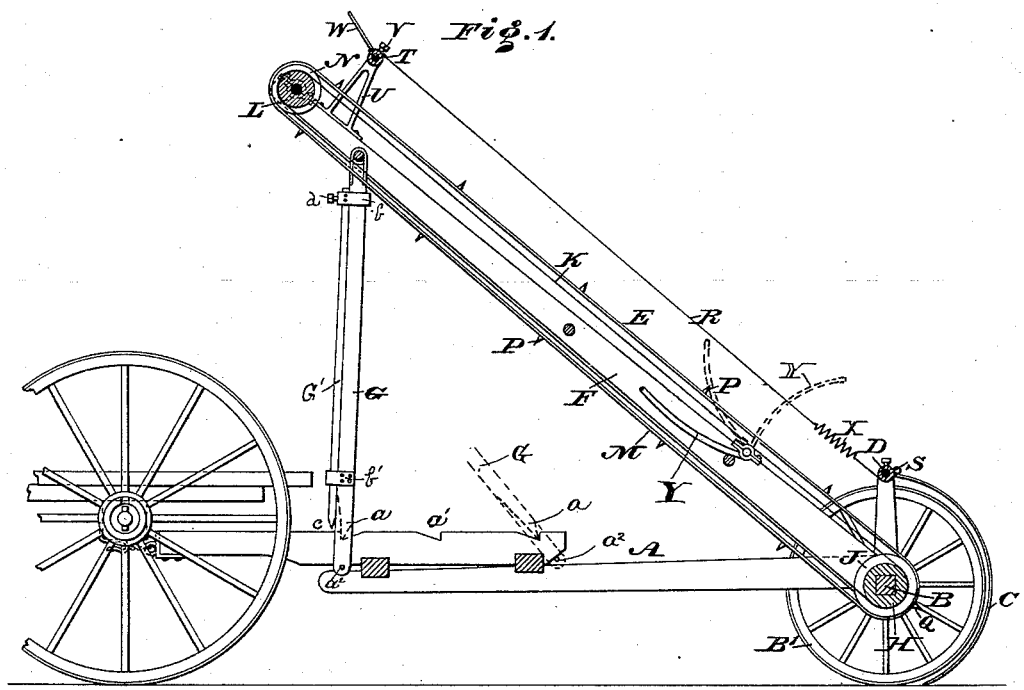
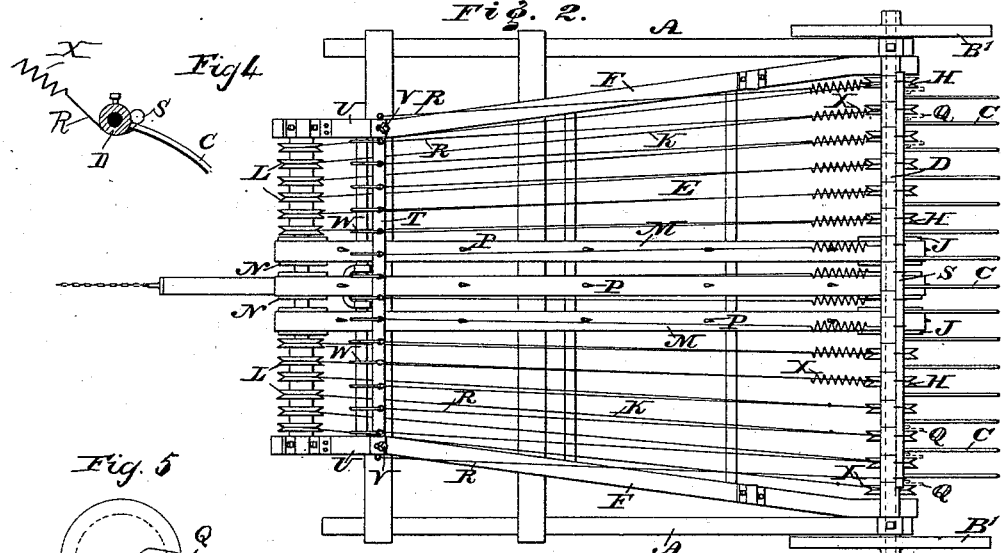
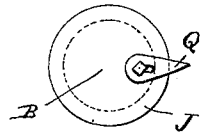
WITNESSES:
L. Douville
W. F. Kircher
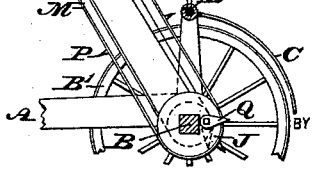
INVENTOR:
Abraham W. Heany
BY John A. Wiedersheim
ATTORNEY.

UNITED STATES PATENT OFFICE.

ABRAHAM W. HEANY, OF PHILADELPHIA, PENNSYLVANIA.

HAY RAKE, LOADER, AND TEDDER.

SPECIFICATION forming part of Letters Patent No. 439,948, dated November 4, 1890.

Application filed February 11, 1886. Serial No. 191,534. (No model.)

*To all whom it may concern:*

Be it known that I, ABRAHAM W. HEANY, a citizen of the United States, residing in the city and county of Philadelphia, State of Pennsylvania, have invented a new and useful Improvement in Hay Rakes, Loaders, and Tedders, which improvement is fully set forth in the following specification and accompanying drawings, in which—

Figure 1 represents a partial side elevation and partial vertical section of a hay rake, loader, and tedder embodying my invention. Fig. 2 represents a top or plan view thereof. Fig. 3 represents a vertical section of a detached portion thereof. Fig. 4 represents a detail view showing the cross-bar with elastic cord connected thereto and passing under the head of the rake-teeth. Fig. 5 represents a detail view of the axle with pulley and spur, shown in Fig. 3.

Similar letters of reference indicate corresponding parts in the several figures.

My invention consists of improvements in hay rakes, loaders, and tedders, as will be hereinafter fully set forth and claimed.

It further consists in connecting the friction-cords with a bar which rests on the rake-teeth, serving to weight the same and hold them uniformly in position.

Referring to the drawings, A represents the draft-frame, whose rear end is supported on the shaft or axle B, the latter being connected with the wheels B' of the apparatus and rotatable therewith.

C represents a series of rake-teeth, which are secured to a head D, the latter being properly supported on the frame A directly above said axle B.

E represents the elevator, the same consisting of a frame F, which is directly mounted on the axle B and has its forward or upper end sustained by a prop G, which is formed of a bar having a toe $a$ on its side near the lower end thereof, the said toe being adapted to rest in a notch or notches in the upper face of one of the sections of the frame A, thereby holding the prop in place. As additional means for securing the prop, the detachable pin $a^2$ is inserted in an opening in the lower end of the bar so as to project between the sections of the frame A. The prop shown in the figure is extensible in character, having an additional bar G' secured to a strap $b$, which latter encircles the main bar of the prop. A second strap $b'$ is secured to the main bar and encircles the bar G', and a clamping-screw $d$ binds the parts together. The lower end of the bar G' is beveled, whereby it serves as a toe for engagement with the notches of the frame A when the bar is extended, it being readily seen that in such case the pin $a^2$ is not employed. The prop herein described forms in itself no part of this invention, as any suitable prop may be used in connection with the rake and tedder herein described.

Secured to or formed with the axle B are grooved pulleys H, which are placed side by side, excepting at the central portion of the axle where the ungrooved pulleys J are secured to or formed with the axle.

K represents endless cords, which are passed around the pulleys H and grooved pulleys L at the upper or forward end of the frame F, and M represents endless belts, which are passed around the pulleys J and pulleys N at the upper or forward end of said frame in lines at a right angle to the axle B, said pulleys L N having in the present case a common axis, it being noticed that the frame F is of tapering form, the narrow end being at the upper or forward end.

The belts M are provided with teeth or spurs P for engaging with the hay, and the pulleys H have conical teeth Q secured to them to assist in lifting the hay from the ground to the elevator, said teeth being adjustably secured to the pulleys, whereby they may be set at different angles or project to greater or less extent from the peripheries of the pulleys, and when not required may be folded or placed out of service. These teeth also serve to release the hay and prevent it from being drawn between the cords and belts and around the axle.

R represents friction-cords, which are located above the elevator and have their lower ends passed under the head D of the rake-teeth and connected with a cross-bar S, which rests on the teeth adjacent to the said head, the weight of said bar serving to weight the rake-teeth, this being increased by the downward draft of the cords R on said bar, the effect being to hold the rake-teeth to their work and retain them uniformly in position. The upper ends of the cords R are connected with a rock-shaft or roller T, which is mounted on brackets or bearings U, rising from the upper end of the frame F, said rock-shaft T being adapted by its rotation to adjust the tension of the cords R. In order to hold said shaft, I employ screws V, which are fitted to the brackets U and bear against said shaft. Connected with the shaft or roller T are teeth W, which form a rack or guard, serving to prevent the return of the hay or overturning of the hay on the cords R when it reaches the top of the elevator. In order to render the cords R removable from the rock-shaft, they are fitted on teeth W, from which they may be readily slipped when so required.

The cords R are rendered elastic or yielding by means of springs X, which may be formed of metal or rubber, or the cords may be entirely formed of springs; but to this I do not limit myself, as the cords may be made of inelastic material without departing from my invention.

On the frame F, near the lower portion thereof, is mounted a rack or deflector Y of curved or semicircular form, which when in use has its teeth projecting outwardly between the cords and belts K M, and when not in use are folded within the frame. The curved form of the deflector directly reverses the direction or course of the hay rearward to the ground. It will be seen that when the hay is gathered by the rake-teeth it is elevated by the belts M and sustained by the cords K in its ascent, and, owing to the converging nature of said cords and the shape of the frame F, the mass is reduced in width or gathered toward the center at the top of the frame and so discharged into the wagon adapted to receive it. This action is assisted by the cords R, which also act as a guard, preventing the hay from being blown away or falling from the elevator.

When it is desired to use the apparatus as a tedder, the elevator-frame is raised and the rack Y is thrown out, as shown in Fig. 3, and the cords R are removed. In this case when the hay reaches the rack it is deflected rearward and so reaches the ground.

As the elevator is mounted directly on the axle or shaft B, it is movable thereon as a center for the purposes of adjustment, &c. The construction of apparatus of the class is thereby simplified, as additional frame-work, supports, &c., are avoided.

When the cords R are made elastic, they yield to the increased thickness of the mass of hay, and thus prevent clogging of the elevator, breakage of the cords, &c.

Having thus described my invention, what I claim as new, and desire to secure by Letters Patent, is—

1. A convertible hay rake, loader, and tedder consisting of an elevator-frame of tapering form carrying at its upper end a shaft having pulleys thereon and a draft-frame, both of said frames being loosely mounted on the same axle of the running-wheels, an axle rotatably secured to the running-wheels and provided with pulleys secured thereto, conveying belts and cords connecting the shaft on the elevator-frame with the axles of the running-gear, rake-teeth secured to a head on the draft-frame, and a transverse bar connected by the cords R to the elevator-frame and resting on the said teeth, all substantially as described.

2. In a hay rake and loader, the frame A, with head D, having rake-teeth C, in combination with frame F, loosely mounted on axle B of the running-gear, the bracket U, attached to said frame F, the rock-shaft T, having bearings in said bracket, the cross-bar S, the friction-cords R, connected to said rock-shaft and cross-bar, and the screw V, operating in bracket U and adapted to hold said rock-shaft T in position, substantially as described.

3. In a hay rake and loader, the frame A, having head D, provided with rake-teeth C, the elevator E, elastic friction-cords R, the cross-bar S, and rock-shaft T, the said cords R being secured at their ends to said rock-shaft T and cross-bar S, all of said parts being combined substantially as and for the purpose set forth.

4. In a combined hay rake and tedder, the axle B, the elevator-frame F, the pulleys H, with adjustable V-shaped teeth Q, and the endless belt M, with teeth P thereon, said parts being combined substantially as described.

5. A hay rake and loader having an elevator and a frame with teeth, a cross-bar adapted to bear on said teeth, the rock-shaft T, and the cord R, with the spring X, and connected with said shaft and cross-bar, said parts being combined substantially as and for the purpose set forth.

ABRAHAM W. HEANY.

Witnesses:
JOHN A. WIEDERSHEIM,
A. P. GRANT.